United States Patent [19]

Kelly et al.

[11] Patent Number: 4,964,102
[45] Date of Patent: Oct. 16, 1990

[54] METHOD FOR ENHANCING AND EVALUATING SEISMIC DATA

[75] Inventors: Michael C. Kelly, Harvey; Richard O. Lindsay, New Orleans, both of La.

[73] Assignee: Amoco Corporation, Chicago, Ill.

[21] Appl. No.: 183,872

[22] Filed: Apr. 19, 1988

[51] Int. Cl.$^5$ .......................... G01V 1/34; G01V 1/36
[52] U.S. Cl. ........................................ 367/47; 367/48; 367/59; 364/421
[58] Field of Search ............................ 367/47, 48, 59; 364/421

[56] References Cited

U.S. PATENT DOCUMENTS

| 4,316,267 | 2/1982 | Ostrander . | |
|---|---|---|---|
| 4,316,268 | 2/1982 | Ostrander . | |
| 4,397,006 | 8/1983 | Galbrath | 367/40 |
| 4,573,148 | 2/1986 | Herkenhop et al. | 367/59 |
| 4,633,447 | 12/1986 | Bodine | 367/47 |
| 4,646,239 | 12/1986 | Bodine . | |
| 4,661,935 | 4/1987 | Shoch et al. | 367/48 |
| 4,677,597 | 6/1987 | Wright | 364/421 |
| 4,691,707 | 9/1987 | Sankar | 73/602 |
| 4,766,574 | 8/1988 | Whitmore et al. | 367/50 |
| 4,779,237 | 10/1988 | Bodine | 367/47 |

FOREIGN PATENT DOCUMENTS 2217458 10/1989 United Kingdom .

OTHER PUBLICATIONS

M. T. Taner, F. Koehler, and R. E. Sheriff "Complex Seismic Trace Analysis" Geophysics, vol. 44, No. 6 (Jun. 1979), pp. 1041-1063.

Primary Examiner—Nelson Moskowitz
Attorney, Agent, or Firm—Timothy D. Stanley

[57] ABSTRACT

A method is provided for enhancing processing and evaluating seismic data. More particularly, a novel method is described for enhancing and evaluating common depth point seismic data. Common depth point (CDP) gathers of seismic signals are processed to suppress random noise and coherent noise and to enhance primary reflection events while preserving geologically-induced amplitude variations as a function of range for the primary reflection events. The processed CDP gathers of seismic signals can then be processed to obtain attributes descriptive of amplitude variations as a function of range for the selected primary reflection event whereby formation lithology and fluid content can be evaluated.

16 Claims, 3 Drawing Sheets

4,964,102

METHOD FOR ENHANCING AND EVALUATING SEISMIC DATA

BACKGROUND OF THE INVENTION

The present invention relates generally to a method for enhancing and evaluating seismic data.

In seismic prospecting, it is conventional to place a plurality of seismic receivers along the earth's surface at spaced locations. A plurality of seismic sources disposed at spaced locations along the earth's surface can then be activated to generate seismic waves which propagate outwardly in all directions. Vibrating devices, explosive devices, and impulsive devices are exemplary of such seismic sources. The seismic waves thus generated are reflected, refracted, and diffracted from subsurface formation interfaces and some of these diverted seismic waves are detected by the seismic receivers and can be processed to form a seismic signal. Such seismic signals can be displayed as seismic sections which contain information about the time, duration and intensity of the diverted seismic waves. The seismic sections can be studied to extrapolate information regarding the type and location of subsurface formations producing the diverted seismic waves. This information, in turn, can be employed to evaluate the subsurface formations for oil- and gas-bearing properties.

Because of the geometry involved, seismic waves reflected from a common reflection point can be received by a first seismic receiver from seismic energy generated by a first seismic source and also by a second seismic receiver from seismic energy generated by a second seismic source. These phenomena are employed in developing common depth point (CDP) seismic data. Each source and receiver pair generating a seismic signal having a common reflection point has a unique range or offset (i.e., the distance separating each source and receiver pair is unique). In practice, seismic data are collected and sorted so that the seismic signals from 3–48 source and receiver pairs having a common reflection point form a "CDP gather" of seismic signals.

The CDP method thus obtains multiple seismic signals for each common reflection point. Because of this redundancy, the seismic signals of a CDP gather can be summed to increase signal-to-noise ratio by reinforcing coherent events within the seismic signals and suppressing random noise. Prior to summing or stacking the seismic signals of a CDP gather, the seismic signals are first processed using normal moveout correction techniques to compensate for the different ray paths of the propagating seismic energy to and from a common reflection point. Summing CDP gathers of moveout corrected seismic signals can thus enhance primary reflection events in the seismic signals which correspond to the propagation of the seismic energy along an assumed ray path to a reflecting interface and at an assumed velocity while suppressing random noise as well as certain multiple reflections of the seismic energy from the reflecting interface.

Once seismic signals of a CDP gather are summed so as to enhance primary reflection events and suppress random noise and multiple reflection events, it is not possible to retrieve the individual seismic signals in such CDP gather for further processing. Thus, processing techniques as described by Ostrander in U.S. Pat. Nos. 4,316,267 and 4,316,268 and by Bodine, et. al., in U.S. Pat. No. 4,646,239 which identify and evaluate amplitude variations as a function of range for selected reflection events in CDP gathers of seismic signals are deprived of a powerful tool for reducing random noise and multiple reflection events while enhancing primary reflection events.

The techniques described by Ostrander and Bodine, et. al., are commonly referred to as "bright spot" analysis or "range dependent amplitude" (RDA) analysis. In fact, RDA analysis techniques have proven to be a powerful exploration tool through their ability to identify seismic reflection events which are likely to correspond to hydrocarbon-bearing formations. RDA analysis techniques have greatly improved exploration success and thus, the importance of utilizing RDA analysis techniques are self-evident. In spite of the potential success to be achieved using RDA analysis techniques, the actual use of RDA analysis techniques is oftentimes unsuccessful because of multiple reflection events and random noise in the seismic data.

Prior to applying RDA analysis techniques, gain correction techniques have generally been used to amplify the seismic signals so as to compensate for temporal and spatial variations in recorded seismic signal amplitude. However, when gain correction techniques have been applied to seismic data having significant random noise and/or multiple reflection events, such gain correction techniques can also have the undesirable effect of modifying geologically-induced amplitude variations (as a function of range) in the seismic data. Consequently, RDA analysis techniques can be ineffective on seismic data having significant random noise and/or multiple reflection events.

The present invention provides a novel method for suppressing random noise and coherent noise (including multiple reflection events) and for enhancing primary reflection events while preserving geologically-induced amplitude variations as a function of range for the primary reflection events. By suppressing random noise and coherent noise while preserving geologically-induced amplitude variations as a function of range for primary reflection events, one can substantially increase the success of employing RDA analysis techniques, whereby attributes descriptive of amplitude variations as a function of range can be obtained for selected primary reflection events. Such attributes can be used to evaluate primary reflection events for their correlation with hydrocarbon-bearing formations.

SUMMARY OF THE INVENTION

The present invention relates generally to a method for enhancing and evaluating seismic data. More particularly, a novel method is described for enhancing and evaluating common depth point seismic data. Common depth point seismic data comprises multiple-fold seismic data which have been sorted into incident-angle ordered gathers of seismic signals. Preferably, such incident-angle-ordered gathers of seismic signals represent a common reflection point in the earth's subsurface. In the present invention, common depth point (CDP) gathers of seismic signals can be processed to suppress random noise and coherent noise (including multiple reflection events) and to enhance primary reflection events while preserving geologically-induced amplitude variations (as a function of range) for the primary reflection events. The processed CDP gathers of seismic signals can then be further processed to obtain attributes descriptive of amplitude variations (as a function of range) for selected primary reflection events whereby formation lithology and fluid content can be evaluated.

In one embodiment of the present invention, CDP gathers of seismic signals are moveout corrected for time differences of the reflected seismic energy traveling along different assumed ray paths to and from a common reflection point. Such moveout-corrected seismic signals are stacked and an amplitude envelope is obtained from a complex signal representation of the stacked signal. A vector product is obtained of each seismic signal in the CDP gather with its corresponding stacked signal amplitude envelope to suppress random noise and coherent noise and to enhance primary reflection events while preserving the primary reflection events' geologically-induced amplitude variations as a function of range.

In order to increase the effectiveness of RDA analysis techniques, random noise and coherent noise can be suppressed in the seismic data according to the present invention prior to the application of either gain correction or RDA analysis techniques. Gain correction and RDA analysis techniques can then be effectively applied whereby attributes descriptive of the amplitude variations for selected primary reflection events can be obtained to evaluate formation lithology and fluid content of selected primary reflection events.

BRIEF DESCRIPTION OF THE DRAWINGS

FIG. 2b represents a stacked signal resulting from the summation of the seismic signals of FIG. 2a;

FIG. 2d represents a vector product of the amplitude envelope of FIG. 2c with each seismic signal in the CDP gather of FIG. 2a;

DETAILED DESCRIPTION OF THE PREFERRED EMBODIMENT

Figure 1:
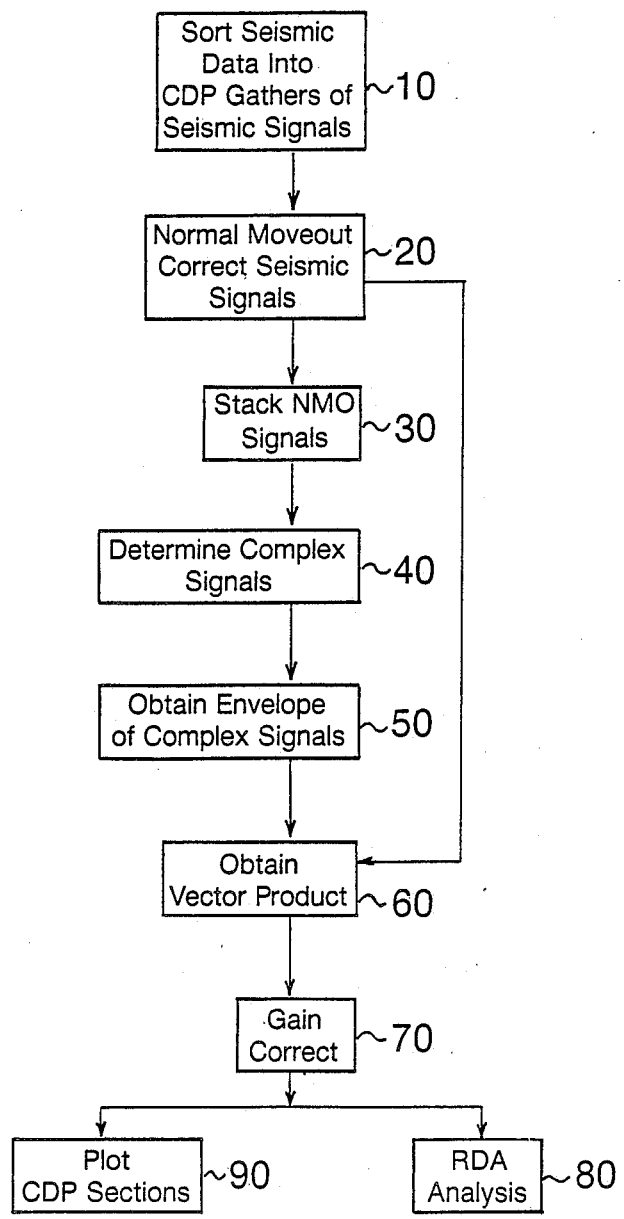
FIG. 1 is a process flow diagram of the present invention.

The present invention relates generally to a method for enhancing and evaluating seismic data.

In order to facilitate a better understanding of the present invention, the following introductory discussion is provided. In seismic data acquisition, it is the usual practice to collect multiple-fold seismic data. One such multiple-fold acquisition technique is generally referred to as common depth point (CDP). In CDP acquisition, a plurality of seismic signals are acquired and then sorted into CDP gathers of seismic signals having a common reflection point. Each seismic signal in a CDP gather is generated by separate pairs of seismic sources and receivers each having a unique separation distance generally referred to as range or offset. Additionally, each seismic signal of a CDP gather can be associated with a unique ray path to a common reflection point and hence, have a unique incident angle $\Psi$ with the common reflection point.

Sorting the multiple-fold seismic data into CDP gathers of seismic signals is merely exemplary since other sorting techniques can be employed in the present invention which sort seismic signals in order of increasing or decreasing incident angle $\Psi$ (for example, common endpoint wherein the common endpoint is either a seismic source or seismic receiver). All such multiple-fold seismic data sets, ordered by incident angle $\Psi$, can be regarded as a simple modification to the invention herein using CDP seismic data merely as an exemplar.

Both Ostrander in U.S. Pat. Nos. 4,316,267 and 4,316,268 and Bodine, et. al. in U.S. Pat. No. 4,646,239, describe the importance of evaluating high intensity seismic events or bright spots within seismic data, all of which are incorporated by reference herein. The analysis techniques of Ostrander and Bodine, et. al. are generally referred to as "bright spot" analysis or "range dependent amplitude" (RDA) analysis and are typically concerned with evaluating the significance of amplitude variations (as a function of either range or incident angle) for selected reflection events within CDP gathers of seismic signals.

A critical step in such RDA analysis techniques is obtaining an accurate measure of geologically-induced amplitude variations (as a function of either range or incident angle) since such amplitude variations can be small when compared to the magnitude of the seismic signal. Prior to applying such RDA analysis techniques, the seismic signals of each CDP gather are gain corrected for temporal and spatial variations in the seismic signal amplitude. However, gain correction techniques can have the undesirable effect of modifying geologically-induced amplitude variations (as a function of range or incident angle) of primary reflection events, especially when the seismic data are contaminated with random noise and/or coherent noise (including multiple reflection events). As such, RDA analysis techniques oftentimes fail to provide meaningful information because of their inability to distinguish true amplitude variations for a primary reflection event from amplitude variations caused by random noise or coherent noise.

An important aspect of the present invention resides in a method for processing incident-angle-ordered gathers of seismic signals to suppress random noise and coherent noise (including multiple reflection events) exhibiting residual normal moveout and to enhance primary reflection events while preserving true amplitude variations (as a function of incident angle or range) of the primary reflection events. Those skilled in the art will recognize that incident angle $\Psi$ and range can be considered equivalent because of the geometry involved. For ease of further discussion, such amplitude variations will hereafter merely be described as variations of range.

Looking now to FIG. 1, a process flow diagram of the present invention is provided. At step 10, multiple-fold seismic data are sorted into incident-angle-ordered gathers of seismic signals. Although several examples of such incident-angle-ordered gathers have been described, preferably the multiple-fold seismic data are sorted into CDP gathers of seismic signals, (i.e., common reflection point).

Figure 2A:
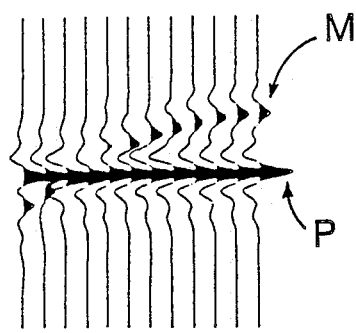
FIG. 2a represents a CDP gather of normal moveout corrected seismic signals.

At step 20, each CDP gather of seismic signals is corrected so as to compensate for differences in travel times of the seismic energy along different assumed ray paths to and from a common reflection point. Such correction techniques are well understood by those skilled in the art and are commonly referred to as normal moveout or simply NMO. When NMO processing is done correctly, primary reflection events appear flat or horizontal across a CDP gather of seismic signals as depicted in FIG. 2a and indicated by the letter P, whereas, coherent noise indicated by the letter M (including multiple reflection events) exhibiting residual normal moveout and random noise have not been so aligned.

Figure 2B:

At step 30, each CDP gather of NMO corrected seismic signals is summed or stacked along isochron lines to obtain a stacked signal as depicted in FIG. 2b. At this juncture, the power of CDP stacking is noted wherein random noise and coherent noise previously depicted in FIG. 2a have been substantially suppressed. However, all information regarding the amplitude variations (as functions of range) for the primary reflection event P has been irretrievably lost.

At step 40, a complex signal is obtained from the stacked signal obtained in step 30. A more comprehensive discussion of the application of complex signal analysis to seismic data is provided by M. T. Taner, F. Koehler, and R. E. Sheriff, in "Complex Seismic Trace Analysis," Geophysics, Volume 44, No. 6, pp. 1041–1063 (1979). Complex signal analysis treats a seismic signal f(t) as the real portion of a complex signal s(t). The complex seismic signal s(t) is composed of a real signal f(t) and its corresponding Hilbert transform F(t), i.e., $$s(t) = f(t) + i \cdot F(t) \tag{1}$$

where $i = \sqrt{-1}$.

In the present invention, f(t) represents the stacked signal and F(t) is its corresponding Hilbert transform. Thus, the complex signal s(t) is a complex representation of the stacked signal f(t).

The stacked signal f(t) can be expressed in terms of a time-dependent amplitude A(t) and a time-dependent phase $\Theta(t)$ as:

$$f(t) = A(t)\cos\Theta(t) \tag{2}$$

Similarly, the Hilbert transform F(t) can be expressed as:

$$F(t) = A(t)\sin\Theta(t) \tag{3}$$

The complex signal s(t) is then:

$$s(t) = A(t)(\cos\Theta(t) + i\sin\Theta(t)) = A(t) e^{i\Theta(t)} \tag{4}$$

Figure 2C:
FIG. 2c represents an amplitude envelope for the stacked signal of FIG. 2b.

Hereafter, A(t) is referred to as the amplitude envelope of the stacked signal f(t). A representation of such amplitude envelope corresponding to the stacked signals of FIG. 2b is depicted in FIG. 2c. At step 50, a measure of the amplitude envelope of the stacked signal can be obtained employing Eqns. 1–4.

Figure 2D:
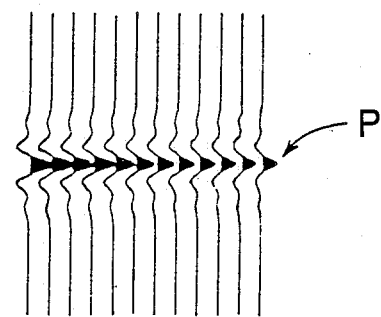

At step 60, a vector product is obtained of the amplitude envelope A(t) and each seismic signal in its corresponding CDP gather. Such vector product is depicted as vector signals in FIG. 2d. Here it can be now seen that random noise and coherent noise have been suppressed and the primary reflection event P has been enhanced while preserving its geologically-induced amplitude variations as a function of range in a CDP gather of vector signals.

An object of the RDA analysis techniques is to determine amplitude variations (as a function of range) for selected primary reflection events. If such RDA analysis techniques are done on moveout corrected data, primary reflection events appear flat within a CDP gather of seismic signals as depicted in FIG. 2a. The vector product step at 60 multiplies each seismic signal across a CDP gather of seismic signals by the same number, thereby preserving geologically-induced amplitude variations with range. Consequently, the relative amplitude of primary reflection events is not modified horizontally. The vector product step can be said to be linear across a CDP gather (i.e., as a function of range) but nonlinear down each seismic signal (i.e., as a function of time). It is the vertical nonlinearity of the vector product step that allows coherent noise exhibiting residual normal moveout and random noise to be suppressed and allows subsequent gain correction of the seismic data to be based on the primary reflection events and not on random noise and/or coherent noise.

At step 70, the resulting vector signals are gain corrected. Gain correction techniques are used to compensate for temporal and spatial attenuation in the recorded seismic signal amplitude. A first gain correction procedure employs deterministic information about the geometry and geology of the subterranean formation. Such deterministic approach can be used to correct for such things as spherical divergence filtering. This process is usually complicated. A second and more common gain correction procedure is to use statistical gain corrections derived directly from the seismic data. Heretofore, problems have arisen in applying statistical gain correction techniques to seismic data having significant coherent noise and/or random noise because such gain correction techniques are derived from the seismic data including random noise and coherent noise.

Since such gain correction techniques adjust the amplitude of the seismic data both with time and range, the geologically-induced amplitude variations as a function of range of a selected primary reflection event, after gain correction, can be adversely affected if random noise and/or coherent noise are present in the seismic data. For RDA analysis techniques it is thus desirable to remove random noise and coherent noise (including multiple reflection events) from the seismic data without disturbing the geologically-induced amplitude variations before applying such gain correction techniques. Failure to suppress random noise and coherent noise while preserving geologically-induced amplitude variations (as a function of range) of selected primary reflection events before gain correction can adversely affect RDA analysis techniques.

Having now obtained CDP gathers of gaincorrected signals wherein random noise and coherent noise exhibiting residual normal moveout have been suppressed and primary reflection events have been enhanced while retaining their geologically-induced amplitude variations as a function of range, RDA analysis techniques can be employed at step 80 to obtain information about formation lithology and fluid content related to such amplitude variations for selected primary reflection events.

By way of example, the RDA analysis techniques of Bodine, et. al. can be employed to obtain attributes descriptive of such range amplitude variations. Here, measures of the amplitude for selected primary reflection events in a CDP gather of gain-corrected signals are statistically fit to equations such as:

$$R_c(\Psi) = B_0 + B_1 \tan^2\Psi + B_2 \sin^2\Psi \tan^2\Psi \tag{5}$$

where $R_c(\Psi)$ is a measure of a reflection coefficient for selected primary reflection events (as a function of incident angle);

$B_0$, $B_1$, and $B_2$ are attributes descriptive of amplitude variations as a function of incident angle; and Ψ is a measure of the incident angle for each assumed ray path from a common reflection point.

The attributes ($B_0$, $B_1$, and $B_2$) thus obtained can be successfully employed to evaluate formation lithology and fluid content. In fact, the present invention has substantially improved the ability to employ RDA analysis techniques such as Bodine, et. al.

Figure 3A:
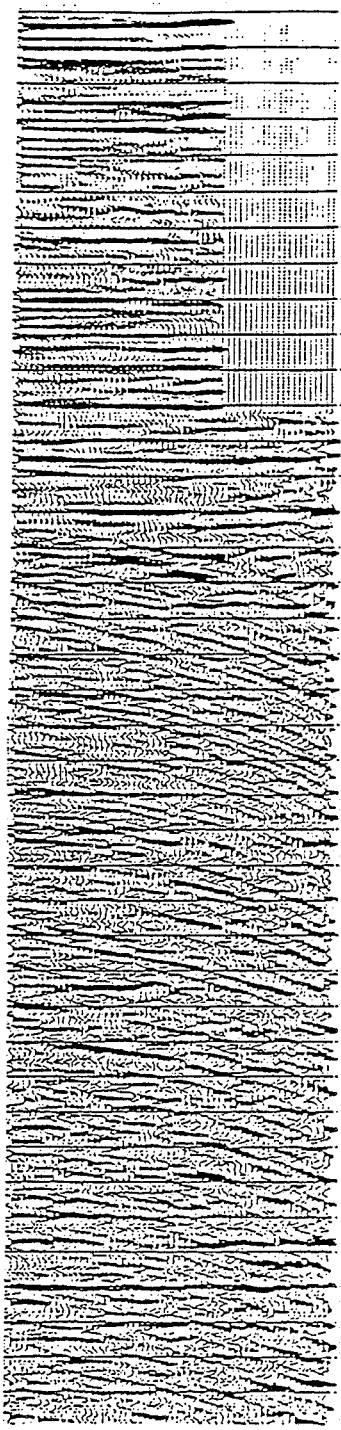
FIG. 3a represents a portion of a seismic section.
Figure 3B:
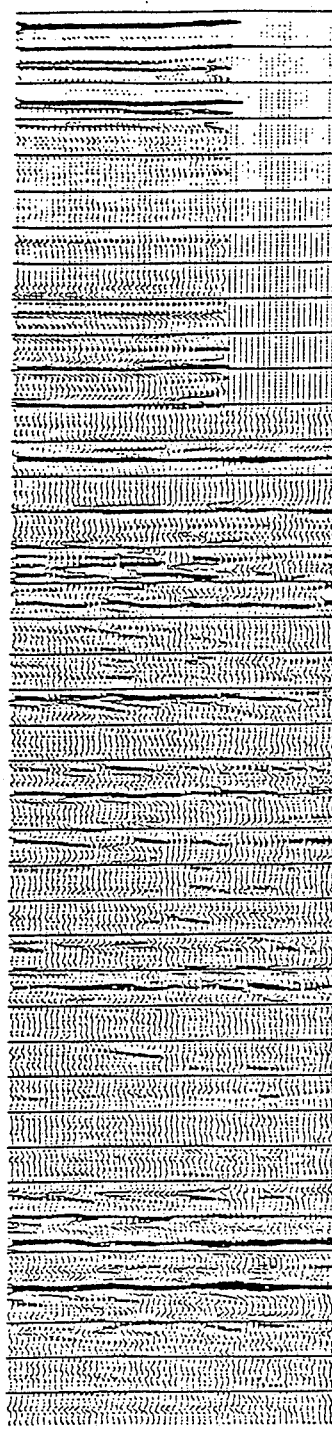
FIG 3b represents the seismic section of FIG. 3a after processing according to the present invention.

At step 90, the gain corrected signals of step 70 can be studied for each CDP gather and a plurality of such stacked signals can be plotted as CDP seismic sections. Looking now to FIGS. 3a and 3b, two seismic sections are represented. The seismic section of FIG. 3a represents seismic data processed according to conventional CDP processing techniques. The seismic data of FIG. 3b represents the same seismic data of FIG. 3a after processing according to steps 10–70 described above wherein the resulting vector signals have been stacked to produce a new CDP section.

While the present invention has been described in specific steps, it is contemplated that those skilled in the art may substitute additional or modified steps without departing from the scope of the invention which is limited only by the appended claims.

We claim:

1. A method for suppressing random noise and coherent noise exhibiting residual normal moveout and for enhancing primary reflection events, while preserving geologically induced amplitude variations as a function of range, in incident-angle-ordered gathers of seismic signals comprising the steps of:
    (a) correcting incident-angle-ordered gathers of seismic signals for differences in traveltime to and from a common reflection point;
    (b) summing the corrected seismic signals and obtaining a stacked signal;
    (c) obtaining an amplitude envelope representative of the stacked signal; and
    (d) obtaining a vector product of the amplitude envelope and each seismic signal of the incident-angle-ordered gather of seismic signals and suppressing random noise and coherent noise exhibiting residual normal moveout and enhancing primary reflection events while preserving its geologically-inducted amplitude variations as a function of range.

2. The method of claim 1 wherein step (c) includes the steps of:
    (a) obtaining a complex signal representation of the stacked signals; and
    (b) obtaining an amplitude envelope of the complex signal.

3. The method of claim 1 wherein the incident-angle-ordered gather of seismic signals includes common depth point gathers and common end point gathers.

4. A method for enhancing seismic data, comprising the steps of:
    (a) summing seismic signals of a common depth point (CDP) gather and obtaining a stacked signal;
    (b) obtaining an amplitude envelope for the stacked signal; and
    (c) obtaining vector signals representative of the product of the amplitude envelope of the stacked signal and each seismic signal of the CDP gather.

5. The method of claim 4, wherein the amplitude envelope is obtained from the stacked signal according to:

$$f(t) = A(t) \cos\Theta(t)$$

where
f(t) = stacked signal;
$\Theta(t)$ = time dependent phase of the stacked signal; and
A(t) = amplitude envelope of the stacked signal.

6. The method of claim 4, wherein the step of obtaining the amplitude envelope comprises the steps of:
    (a) obtaining a complex signal representative of the stacked signal; and
    (b) obtaining an amplitude envelope of the complex signal.

7. A method for enhancing seismic data, comprising the steps of:
    (a) obtaining incident-angle-ordered gathers of seismic signals;
    (b) linearly multiplying seismic signals of each incident-angle-ordered gather with a first function for horizontally preserving the relative amplitude of reflection events therein; and
    (c) nonlinearly multiplying the seismic signals of each incident-angle-ordered gather with a second function for vertically suppressing coherent noise and random noise therein.

8. The method of claim 7, wherein step (b) comprises:
    (a) summing the seismic signals of the incident-angle-ordered gather and obtaining a stacked signal;
    (b) obtaining an amplitude envelope for the stacked signal; and
    (c) obtaining vector signals representative of a product of the amplitude envelope of the stacked signal and each seismic signal of the incident-angle-ordered gather.

9. The method of claim 7, wherein step (c) comprises:
    (a) summing the seismic signals of the incident-angle-ordered gather and obtaining a stacked signal;
    (b) obtaining an amplitude envelope for the stacked signal; and
    (c) obtaining vector signals representative of a product of the amplitude envelope of the stacked signal and each seismic signal of the incident-angle-ordered gather.

10. The method of claim 7, wherein the incident angle ordered gathers of seismic signals comprise common endpoint and common depth point gathers of seismic signals.

11. The method of claim 8, wherein the amplitude envelope comprises the first function.

12. The method of claim 9, wherein the amplitude envelope comprises the second function.

13. A method for enhancing seismic data, comprising the steps of:
    (a) obtaining an amplitude envelope representative of an incident-angle-ordered gather of seismic signals; and
    (b) developing a vector product of the amplitude envelope and each seismic signal of the incident-angle-ordered gather of preserving relative geologically induced amplitude variations and for suppressing random noise and coherent noise exhibiting residual moveout in the seismic signals.

14. The method of claim 13 wherein the step of obtaining an amplitude envelope comprises obtaining an amplitude envelope representative of the sum of the incident-angle-ordered gather of seismic signals.

15. The method of claim 13 wherein the step of obtaining a vector product includes linearly enhancing primary reflection events in the seismic signal as a function of range.

16. The method of claim 13 wherein the step of obtaining a vector product includes nonlinearly suppressing random noise and coherent noise exhibiting residual moveout as a function of time in the seismic signals.

* * * * *